Figure 1:
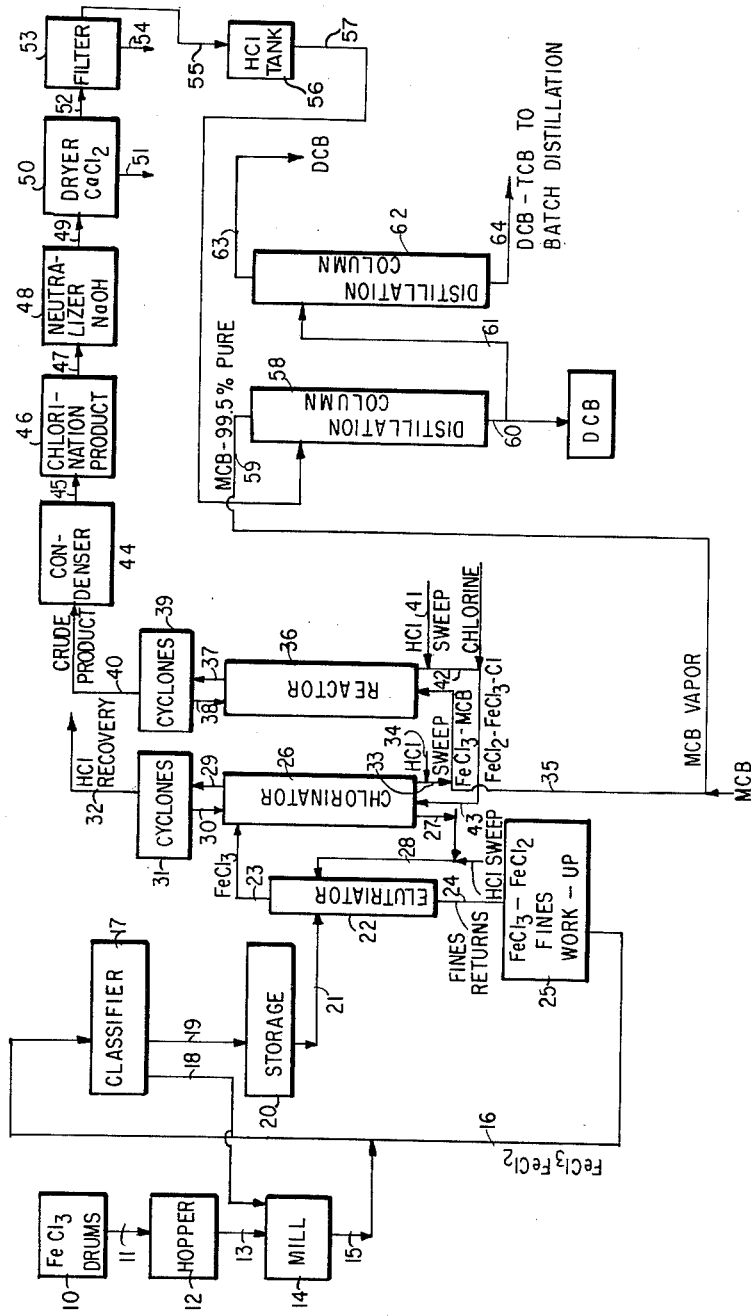

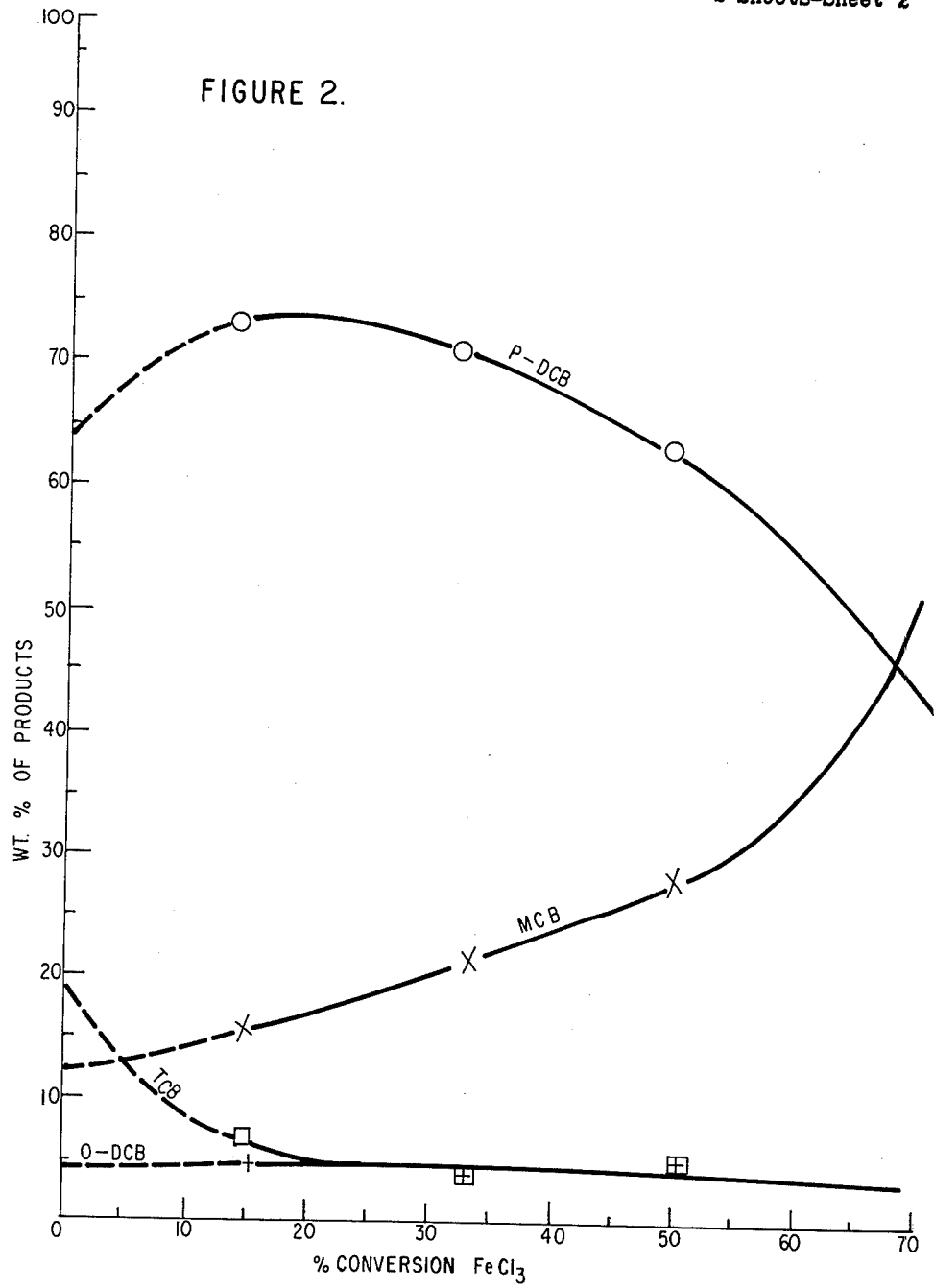

United States Patent Office 3,029,296
Patented Apr. 10, 1962

3,029,296
CHLORINATION PROCESS
William A. White and Robert A. Ruehrwein, Dayton, Ohio, assignors to Monsanto Chemical Company, St. Louis, Mo., a corporation of Delaware
Filed Dec. 21, 1959, Ser. No. 860,890
4 Claims. (Cl. 260—650)

This invention relates to the chlorination of monochlorobenzene. More particularly this invention relates to process for the chlorination of monochlorobenzene to obtain dichlorobenzene having a high para to ortho ratio.

According to conventional processes for preparing dichlorobenzene, benzene is contacted with elemental chlorine in the presence of a conventional catalyst such as aluminum chloride. In these processes it is found that the molar proportion of para-dichlorobenzene relative to ortho-dichlorobenzene is about 1.5:1. Since the para isomer is the more valuable product, those in the art are seeking methods of increasing the production of the para isomer while decreasing the relative amount of the ortho isomer. Kovacic and Brace have reported (J. Am. Chem. Soc., 76, pp. 5491–4, 1954) that dichlorobenzene having a para/ortho ratio of 8:1 could be obtained by chlorinating monochlorobenzene (MCB) to dichlorobenzene (DCB) in the liquid phase using ferric chloride as the chlorinating agent.

It is an object of this invention to provide an improved process for preparing dichlorobenzene having a higher para/ortho ratio than was previously obtainable.

It is a further object of this invention to provide a method of preparing dichlorobenzene having a para isomer to ortho isomer ratio of at least 13:1.

It is yet another object of this invention to provide an economical method of preparing high yields of para dichlorobenzene.

Other objects of this invention will become apparent as the description thereof proceeds.

The foregoing and related objects are accomplished according to the present invention, by a process to be described more fully, the essential features of which are the contacting of monochlorobenzene in the vapor state with solid ferric chloride as a chlorinating agent at a reaction temperature of from 112° to 225° C., preferably 150 to 190° C. By so conducting the reaction, we have found that dichlorobenzene having an unexpectedly high para to ortho isomer weight ratio, on the order of at least 13 parts by weight of the para dichlorobenzene to 1 part by weight of the ortho isomer, is obtained. Under closely controlled conditions it is possible to prepare para dichlorobenzene of 96% purity directly by this method. The ferrous chloride, obtained as a result of the monochlorobenzene chlorination, can easily be chlorinated and reused to react with more monochlorobenzene. Although any system for contacting solid ferric chloride with the monochlorobenzene in the vapor state can be used, we have found it most economical and convenient to pass the monochlorobenzene vapor through a bed of ferric chloride. By so operating the reaction variables, such as reaction temperature, column packing, effective ferric chloride bed length, rate of flow of monochlorobenzene vapor, amount of monochlorobenzene passed through the column, and degree of rechlorination of ferrous chloride to ferric chloride can be controlled to prepare the desired proportions of dichlorobenzene having the para to ortho ratio desired. But the process so conducted is particularly adapted for operation when a high yield of dichlorobenzene having a very high para to ortho ratio is the desired product.

The monochlorobenzene used in the process of this invention can be obtained from any source. It may be manufactured by any of the processes known in the art.

The chlorination process of this invention can be conducted at any temperature at which the monochlorobenzene is in a vapor state.

The lowest temperature of operating this process depends to some extent upon the products found in the chlorination reaction vessel. These lowest temperatures for operating to obtain various degrees of chlorinations are summarized by the graph of FIGURE 2. However, at low temperatures the rate of reaction of monochlorobenzene with ferric chloride is rather slow. Since it is desired to operate as efficiently as possible in terms of monochlorobenzene to dichlorobenzene conversion it is preferred to maintain the reaction temperature above around 150° C. Higher temperatures of reaction than those specified can also be used. However, at temperatures above 190° C. measurable amounts of ferric chloride are lost by sublimation and the amount of trichlorobenzene obtained becomes greater. Hence, we have found that the optimum and preferred temperature of reaction is from about 150° C. to 190° C. However, lower temperatures can be used when the percent of monochlorobenzene converted to dichlorobenzene is not critical, as when the unconverted monochlorobenzene is reused in the process. Similarly higher temperatures can be used when the degree of ferric chloride loss and amount of trichlorobenzene produced are not critical.

When conducting this process in a fixed or moving bed of ferric chloride, such as in a fluidized bed, the most optimum rate of flow of the monochlorobenzene vapor and the effective ferric chloride bed length are dependent upon the type of bed used, and the shape of the apparatus used, which factors are readily determinable by those skilled in the art. We have found in our experiments that, in general, better dichlorobenzene yields having high para/ortho ratios are obtained with ferric chloride bed conversions of from 15 to 30 percent since after 50 percent conversion of the ferric chloride bed to ferrous chloride, 28 percent of the monochlorobenzene passes through the bed unconverted. The effective bed length is also an important factor since for a given rate of flow of monochlorobenzene vapor, when the effective bed length is greater, more trichlorobenzene is produced.

When the dichlorobenzene product has been separated from any remaining monochlorobenzene and trichlorobenzene, the para dichlorobenzene can be separated from the ortho dichlorobenzene by known physical means, e.g. distillation, crystallization, etc.

The method of this invention is illustrated by several examples the results of which are summarized in Table 1. The apparatus used in each of the examples consisted of a monochlorobenzene metering system, chlorine metering system, a reacting column, a product receiving system, and an off-gas scrubbing system.

The monochlorobenzene metering system consisted of a monochlorobenzene boiler, a rotameter, a constant temperature oil bath, and suitable electrically heated transfer lines. The top of the monochlorobenzene boiler was graduated in 0.2 cc. divisions and was read to 0.1 cc.

Monochlorobenzene was charged to the boiler through the 2 mm. capillary filling tube with the oil bath at room temperature or during cooling of the oil bath. Vacuum type metal valves sealed in the glass system were used as stopcocks. These valves were fitted with hand extensions so that they could be operated from outside the oil bath.

All transfer lines were electrically heated to a temperature higher than the oil bath, and lower than the column temperature.

The reaction column (internal diameter 1.030 in. and outer diameter 1.190 in.) was packed with a mixture of anhydrous ferric chloride (approximately 55 g.) and glass melting tubes cut into 1 cm. lengths. These randomly dispersed tubes helped to prevent plugging and channeling in reaction column. A loose glass wool plug was placed at both the top and bottom of the column. The column was also fitted with a thermocouple well and column temperautre was read on a potentiometer using a chromel-alumel thermocouple. The column was heated by a split tube furnace. Its temperature was controlled by a chromel-alumel thermocouple through an Amplitrol Controller. The bottom of the furnace was fitted with a first brick plug and wrapped with asbestos rope. The transfer tube at the top of the column was electrically wound and heater high enough to transfer the products to the receiver.

The product receiving system was fitted with a water condenser, a product receiver, and a stop cock for removing the chlorinated product.

The HCl and $CL_2$ which passed through the column were absorbed in a NaOH scrubbing system. Water was prevented from entering the system by a $CaCl_2$ drying tube.

All product analyses as shown in Table 1 were made by vapor phase chromatography. The conditions for these analyses in a modified Kromotog were as follows:

| | |
|---|---|
| Eluent | Helium. |
| Column length | 2.5 meters. |
| Column temp. | 128° C. |
| Column packing | Fire brick treated with 20% polystyrene glycol. |
| Conductivity cell temp. | 200° C. |
| Conductivity cell current | 140 ma. |
| Recorder sensitivity | 80. |
| Chart speed | One division/min. |
| Sample size | .005 cc. |

Table 1A summarizes the conditions of reactions, namely the temperature, amount of monochlorobenzene, flow rate, time, and the weight of the product obtained. Table 1B shows the results of the analyses of the chlorinated products of the respective examples, the para to ortho weight ratio of the dichlorobenzene products obtained ($p/o$), the amount of monochlorobenzene in pounds required to produce one hundred pounds of p-dichlorobenzene according to that example, and the degree of conversion of the ferric chloride bed during the respective runs.

TABLE 1A

*Monochlorobenzene Chlorination Using $FeCl_3$ as Chlorinating Agent*

| Example No. | Column Temp., °C. | | | | High Temp. Measured | Vol. MCB, cc. | Wt. MCB, g. | Time of Chlorination, Min. | Flow Rate MCB, g./min. | Wt. of Product, g. |
|---|---|---|---|---|---|---|---|---|---|---|
| | Bottom | Mid. | Top | Ave. | | | | | | |
| 1 | 172 | 169 | 170 | 170 | 174 | 4.1 | 4.01 | 13 | .308 | 4.04 |
| 2 | 179 | 166 | 164 | 170 | 181 | 8.2 | 8.01 | 26 | .309 | 9.89 |
| 3 | 161 | 167 | 168 | 165 | 169 | 14.7 | 14.36 | 43 | .334 | 16.31 |
| 4 | 160 | 165 | 170 | 165 | 171 | 5.05 | 4.93 | 80 | .062 | 5.72 |
| 5 | 161 | 167 | 168 | 165 | 170 | 4.8 | 4.69 | 8 | .588 | 5.99 |
| 6 | 160 | 166 | 170 | 166 | 172 | 3.5 | 3.42 | 5 | .686 | 4.26 |
| 7 | 175 | 190 | 192 | 186 | 192 | 8.6 | 8.03 | 26 | .324 | 10.00 |
| 8 | 177 | 184 | 199 | 187 | 199 | 16.0 | 15.63 | 51 | .306 | 17.62 |
| 9 | 174 | 181 | 196 | 184 | 196 | 5.0 | 4.88 | 7 | .598 | 5.86 |
| 10 | 157 | 157 | 169 | 161 | 171 | 8.0 | 7.82 | 25 | .313 | 9.18 |
| 11 | 155 | 155 | 167 | 159 | 169 | 7.9 | 7.72 | 53 | .146 | 9.20 |
| 12 | | | | (211) | | 9.9 | 9.59 | 35 | .276 | 12.35 |

TABLE 1B

*Monochlorobenzene Chlorination Using $FeCl_3$ as Chlorinating Agent*

| Example No. | Wt. Percent MCB | p-DCB | o-DCB | TCB | P/O Ratio | Percent MCB Poly Chlor | Conversion | | Lbs. MCB to product 100 lbs recov. p-DCB | Percent $FeCl_3$ converted |
|---|---|---|---|---|---|---|---|---|---|---|
| | | | | | | | Di Chlor | p-DCB | | |
| 1 | 15.6 | 73.0 | 4.67 | 6.73 | 15.6 | 84.6 | 77.67 | 73.0 | 117 | 14.7 |
| 2 | 21.35 | 71.0 | 3.75 | 3.90 | 18.9 | 78.6 | 74.8 | 71.0 | 86 | 32.8 |
| 3 | 27.96 | 63.0 | 4.52 | 4.52 | 14.0 | 72.0 | 67.5 | 63.0 | 95.2 | 50.2 |
| 4 | 4.63 | 72.94 | 4.63 | 17.8 | 15.8 | 95.37 | 77.57 | 72.9 | 114 | 25.0 |
| 5 | 41.26 | 49.37 | 2.62 | 6.75 | 18.9 | 68.74 | 51.99 | 49.37 | 76.4 | 15.5 |
| 6 | 36.75 | 58.04 | 2.69 | 2.52 | 21.6 | 63.25 | 60.73 | 58.04 | 76.2 | 11.3 |
| 7 | 20.61 | 68.70 | 3.05 | 7.64 | 22.5 | 79.39 | 71.75 | 68.70 | 93.7 | 34.6 |
| 8 | 41.67 | 51.74 | 2.67 | 3.92 | 19.4 | 58.33 | 54.41 | 51.74 | 92.5 | 44.0 |
| 9 | 35.39 | 57.38 | 3.56 | 3.67 | 16.1 | 64.61 | 60.94 | 57.38 | 85.4 | 16.1 |
| 10 | 35.34 | 59.13 | 3.35 | 2.18 | 17.6 | 64.66 | 62.48 | 59.13 | 85.8 | 24.9 |
| 11 | 31.50 | 61.78 | 3.5 | 3.67 | 20.2 | 68.5 | 64.83 | 61.78 | 86.3 | 27.8 |
| 12 | 9.93 | 77.7 | 3.86 | 8.5 | 20.1 | 90.07 | 81.56 | 77.0 | 89.4 | 48.0 |

From Table 1 it can be seen that within the given temperature limits the temperature is not an important factor in obtaining good yields of dichlorobenzenes having a high para to ortho ratios. However, when the higher temperatures are used the product contains larger quantities of trichlorobenzene. Besides temperature, other factors which affect the nature of the chlorinated product obtained are the time during which the monochlorobenzene is contacted with the ferric chloride, which is in turn, dependent upon the type and degree of ferric chloride column packing that is used, the bed length, and rate of flow of monochlorobenzene gas through the bed. Also to be considered are the total amount of monochlorobenzene that passes through or over a given quantity of ferric chloride in a given time, and the extent of rechlorination of the ferrous chloride to ferric chloride which is used as the chlorinating agent. An example of the effect of a slow rate of flow of monochlorobenzene vapor through the bed of ferric chloride is illustrated by Example 4 in Tables 1A and 1B wherein a higher quantity of trichlorobenzene was obtained. The variation of effective ferric chloride bed length is illustrated by the graph of FIGURE 2, described below.

To show the effect of temperature on the rechlorination of the ferrous chloride obtained from the monochlorobenzene chlorination, 1 g. samples of ferrous chloride were chlorinated at atmospheric pressure by passing chlorine over the samples at 26° C. These percentages of rechlorination were determined by analyzing for total iron and ferrous chloride. These results are shown in Table 2.

TABLE 2

*Chlorination of $FeCl_2$*

| Temperature, °C. | Time of Chlorination, min. | Percent Chlorinated |
|---|---|---|
| 26 | 30 | 26.7 |
| 120 | 3 | 95.2 |
| 120 [1] | 3 | 59.2 |

[1] The $FeCl_2$ in this experiment was wet with 25 wt. percent para dichlorobenzene.

FIGURE 1 depicts in flow sheet form one specific embodiment of this process and illustrates the production of dichlorobenzene having a high para/ortho ratio from monochlorobenzene using ferric chloride as the chlorinating agent in a moving, fluidized bed system. According to this embodiment, anhydrous ferric chloride initially received in water proof containers 10 is passed via line 11 into hopper 12. From the hopper, the ferric chloride is conveyed via line 13 to a mill 14 where the ferric chloride is ground to the desired size, and then is conveyed via line 15 to line 16 where it merges with a ferric chloride-ferrous chloride mixture obtained from the fines work-up tank 25 and is passed to the classifier 17. The ferric chloride-ferrous chloride mixture is graded in classifier 17, any oversize particles being returned via line 18 to the mill. The classified ferric chloride-ferrous chloride mixture is transferred via line 19 to the storage tank 20 where it stays until use thereof is desired. From the storage system the ferric chloride-ferrous chloride mixture passes via line 21 to an elutriator system 22 and then to the chlorinator 26 via line 23. Any fines obtained from the chlorinator are transferred via lines 27 and 28 into the elutriator and conveyed via line 24 to fines work-up system 25 from which the material is conveyed to classifier 17, via line 16, and reprocessed as before. An HCl gas sweep enters line 28 to convey fines to the elutriator. Chlorine gas entering the system in line 43 serves to move the ferric chloride-ferrous chloride mixture obtained from the reactor 36 via line 42 into the chlorinator 26 where the ferrous chloride is converted to ferric chloride. The chlorine gas together with the hydrogen chloride by-product gas serves as the fluidizing gas in the chlorinator. The by-product hydrogen chloride, which may have ferric chloride fines entrained therein, leaves the chlorinator via line 29 into a cyclone system 31 and then to a hydrogen chloride recovery system via line 32. The solid fines return to the chlorination from the cyclone system via line 30. The fully chlorinated ferric chloride solid leaves the chlorinator via line 33 and is swept into line 35 by hydrogen chloride gas from line 34. Monochlorobenzene vapor enters the system via line 35 and pushes the ferric chloride solid particles into the fluidized bed reactor 36. The monochlorobenzene vapors react with the ferric chloride so contacted and are converted to dichlorobenzene and trichlorobenzene as it passes through line 35 and reactor 36. The amount of trichlorobenzene, obtained will, of course, depend upon the factors discussed above. The crude chlorinated benzene product leaves the reactor via line 37, passes through a cyclone system 39, and then proceeds via line 40 to a condenser system 44. Any fines carried out of the reactor are returned from the cyclone system to the reactor via line 38. The chlorine depleted ferric chloride-ferrous chloride particles obtained as a result of the chlorination of the monochlorobenzene in the reactor, are transferred via line 42, with the aid of a hydrogen chloride sweep from line 41, into line 43 where the particles are contacted with chlorine gas and returned to the chlorinator to be rechlorinated as described above. The crude chlorination product which comprises mainly hydrogen chloride, unreacted monochlorobenzene, dichlorobenzenes having a high para/ortho ratio, and trichlorobenzene, the proportions of each depending on the several variable factors discussed above, are transferred from the condenser 44 via line 45 to a hold tank 46. The crude product is then transferred via line 47 to a neutralizer system 48 where it is treated with a base, such as sodium hydroxide to remove the chloride ion from the hydrogen chloride by-product, and then passed via line 49 through a calcium chloride dryer 50 to remove the water by-product, from the neutralization step. After the drying step the crude product is passed via line 52 through a filter system 53 to remove any entrained solids, such as sodium chloride and any ferric chloride which are removed via line 54. The so purified crude mixture of chlorinated benzenes is then transferred via line 55 to hold tank 56 from which it is dispensed as needed via line 57 to the primary distillation column 58. The unconverted monochlorobenzene is removed in substantially pure form via line 59 and recycled to be reintroduced into the system via line 35. The bottoms from distillation column 58, comprising primarily the dichlorobenzenes and trichlorobenzene are removed via line 60 and conveyed via line 61 to the secondary distillation column 62, if necessary. When the bottoms being removed from distillation column 58 via line 60 contain only insignificant amounts of trichlorobenzene, the product can be removed from line 60 and further distillation dispensed with. However, where substantial quantities of trichlorobenzene are encountered further distillation is conducted in columns such as the secondary distillation column 62 with the product dichlorobenzene having a para/ortho ratio of near 20 being removed via line 63. Any bottom residual product recovered from line 64 can be further worked up in batch process distillation equipment to remove even more dichlorobenzene. It is understood that after this method of operation becomes stabilized it will be necessary to replace $FeCl_3$ only to the extent due to mechanical reasons such as spillage, etc., and that loss due to sublimation of ferric chloride when high temperatures are used.

FIGURE 2 is graphical representation, drawn from example runs made according to the process of this invention, showing the weight percent of products obtained at 170° C. and a monochlorobenzene flow rate of about 0.3 g./min. for various ferric chloride bed conversions in a stationary bed. This graph shows that in the first part of the run, when the effective bed length is greatest, that more trichlorobenzene is produced. After 50% conversion of the bed 28% of the monochlorobenzene is passing through the bed unconverted. These numerial values will depend on the column packing, the geometry of the system, the temperature of the column and the flow rate of monochlorobenzene vapors.

Although the invention has been described in terms of specified examples which are set forth in considerable detail it should be understood that this is by way of illustration only and that the invention is not necessarily limited thereto, since alternative embodiments will become apparent to those skilled in the art in view of the disclosure. For example, for some purposes it may be advisable to dilute the monochlorobenzene with an inert gas such as nitrogen. Also, it may be advisable when conducting the process of this invention in a fluidized bed system to use inert particles having ferric chloride coating thereon as the chlorinating agent.

A method for chlorinating monochlorobenzene so as to obtain high yields of dichlorobenzene having a high para/ortho ratio has been described. It has been shown that the quantity and quality of the crude dichlorobenzene product obtained by this method is a function of several variables. It has been shown how these variables can be correlated to obtain dichlorobenzene products having high para/ortho ratios.

We claim:

1. A chlorination process which comprises contacting and reacting monochlorobenzene vapor and ferric chloride as the essential chlorinating agent at a temperature of from about 150° to 190° C. and recovering from the resulting chlorinated benzene product dichlorobenzene having a para to ortho isomer weight ratio of from at least 13 parts by weight of the para isomer to 1 part by weight of the ortho isomer.

2. Process for chlorinating monochlorobenzene in the vapor state which comprises passing monochlorobenzene vapor over ferric chloride at a reaction temperature of from 150° C. to 190° C., and recovering from the resulting chlorinated benzene product dichlorobenzene having a para to ortho isomer weight ratio of at least 13 parts by weight of the para isomer to 1 part by weight of the ortho isomer.

3. Process for chlorinating monochlorobenzene which comprises passing monochlorobenzene vapor through a quantity of ferric chloride-containing particles at a temperature of from 150° C. to 190° C., and recovering from the resulting gaseous reaction product dichlorobenzene having a para to ortho isomer weight ratio of at least 13 parts by weight of the para isomer to 1 part by weight of the ortho isomer.

4. A continuous chlorination process which comprises passing monochlorobenzene vapor through a fluidized bed of ferric chloride containing particles at a temperature of from 150° C. to 190° C., collecting and condensing the resulting crude dichlorobenzene-containing product, separating and recycling any unconverted monochlorobenzene from the crude dichlorobenzene-containing product for re-use in the process, purifying and recovering dichlorobenzene product having a para to ortho isomer weight ratio of at least 13 parts by weight of the para isomer to the ortho isomer, rechlorinating the first chloride particles, obtained as a result of the monochlorobenzene chlorination step, to ferric chloride, and recycling the ferric chloride so-obtained for re-use in the process for chlorinating more monochlorobenzene.

References Cited in the file of this patent
Kovacic et al.: J. Am. Chem. Soc., 5491-4 (1954).